United States Patent
Admasu et al.

(10) Patent No.: US 12,159,395 B2
(45) Date of Patent: Dec. 3, 2024

(54) SYSTEM AND METHOD FOR IDENTIFYING AND ANALYZING DESIRED PROPERTIES OF A MATERIAL

(71) Applicant: Ford Global Technologies, LLC, Dearborn, MI (US)

(72) Inventors: Alemayehu Admasu, Ann Arbor, MI (US); Devesh Upadhyay, Canton, MI (US); Patrick James Blanchard, Ann Arbor, MI (US); Janice Lisa Tardiff, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 474 days.

(21) Appl. No.: 17/528,784

(22) Filed: Nov. 17, 2021

(65) Prior Publication Data

US 2023/0153988 A1   May 18, 2023

(51) Int. Cl.
*G06T 7/00* (2017.01)
*G06F 30/27* (2020.01)

(52) U.S. Cl.
CPC ............. *G06T 7/001* (2013.01); *G06F 30/27* (2020.01); *G06T 2207/20081* (2013.01); *G06T 2207/20084* (2013.01)

(58) Field of Classification Search
CPC .. G06F 30/27; G06F 18/2321; G06F 18/2411; G06F 18/24137; G06F 2111/06;
(Continued)

(56) References Cited

U.S. PATENT DOCUMENTS

2019/0018933 A1   1/2019 Oono et al.
2020/0098450 A1*  3/2020 Uesawa ................. G06N 3/045
(Continued)

FOREIGN PATENT DOCUMENTS

CN   111445965   7/2020
CN   112101432   12/2020
(Continued)

OTHER PUBLICATIONS

Tang, X., Bassir, D.H. & Zhang, W. Shape, sizing optimization and material selection based on mixed variables and genetic algorithm. Optim Eng 12, 111-128 (2011). https://doi.org/10.1007/s11081-010-9125-z.*
(Continued)

*Primary Examiner* — Bobbak Safaipour
*Assistant Examiner* — Michael Kim Maiden
(74) *Attorney, Agent, or Firm* — Burris Law, PLLC

(57) ABSTRACT

A method including generating a plurality of synthetic images of a material, where each synthetic image from among the plurality of synthetic images is associated with a feasibility value greater than a threshold synthetic feasibility value. The method includes determining, for each synthetic image from among the plurality of synthetic images, one or more material properties of the material and one or more process parameters of the material based on the synthetic image and generating a plurality of data points and a pareto surface based on the one or more material properties and the one or more process parameters. The method includes selecting a target data point based on the plurality of data points and a distance between a set of data points from among the plurality of data points and the pareto surface.

20 Claims, 5 Drawing Sheets

(58) Field of Classification Search
CPC ........... G06T 7/001; G06T 2207/20081; G06T 2207/20084; G06N 3/0464; G06N 3/0475; G06N 3/094; G06V 10/82; G16C 20/30; G16C 20/70
See application file for complete search history.

(56) References Cited

U.S. PATENT DOCUMENTS

| | | |
|---|---|---|
| 2020/0168302 A1 | 5/2020 | Isayev et al. |
| 2020/0272703 A1 | 8/2020 | Kim et al. |
| 2021/0343001 A1* | 11/2021 | Grama ................. G06N 3/0475 |

FOREIGN PATENT DOCUMENTS

| | | |
|---|---|---|
| JP | 4888227 | 2/2012 |
| KR | 1020200080391 | 7/2020 |
| WO | 2020130513 | 6/2020 |
| WO | 2020176164 | 9/2020 |

OTHER PUBLICATIONS

Fu G, Khu ST, Butler D. Use of surrogate modelling for multiobjective optimisation of urban wastewater systems. Water Sci Technol. 2009;60(6):1641-7. doi: 10.2166/wst.2009.508. PMID: 19759467.*

Monalisa Pal, Sriparna Saha, Sanghamitra Bandyopadhyay, DECOR: Differential Evolution using Clustering based Objective Reduction for many-objective optimization, Information Sciences, vol. 423, 2018, pp. 200-218, ISSN 0020-0255, https://doi.org/10.1016/j.ins.2017.09.051.*

Ludwig, Discovery of New Materials Using Combinatorial Synthesis and High-throughput Characterization of Thin-Film Materials Libraries Combined with Computational Methods, NPJ Computational Materials, Jul. 10, 2019, vol. 70,7 pages.

Gallagher, et al., Predicting Compressive Strength of Consolidated Molecular Solids Using Computer Vision and Deep Learning, Materials and Design, Feb. 5, 2020, pp. 1-11, vol. 190, Elsevier.

He, et al., Deep Residual Learning for Image Recognition, Dec. 10, 2015, 12 pages, available at URL https://arxiv.org/pdf/1512.03385.pdf.

He et al., AttGAN: Facial Attribute Editing by Only Changing What You Want, Jul. 25, 2018, 16 pages, available at URL https://arxiv.org/pdf/1711.10678.pdf.

Krizhevsky, et al., ImageNet Classification with Deep Convolutional Neural Networks, Communications of the ACM, Jun. 2017, pp. 84-90, vol. 60(6).

Liu, et al., Explainable Deep Learning for Uncovering Actionable Scientific Insights for Materials Discovery and Design, Jul. 20, 2020, pp. 1-27, available at URL https://arxiv.org/pdf/2007.08631.pdf.

Shorten, et al., A Survey on Image Data Augmentation for Deep Learning, Journal of Big Data, 2019, 48 pages, vol. 6:60, SpringerOpen.

Conceição António, Local And Global Pareto Dominance Applied To Optimal Design And Material Selection Of Composite Structures, Structural and Multidisciplinary Optimization, Feb. 6, 2013, pp. 73-94, vol. 48.

* cited by examiner

SYSTEM AND METHOD FOR IDENTIFYING AND ANALYZING DESIRED PROPERTIES OF A MATERIAL

FIELD

The present disclosure relates to systems and methods for identifying and analyzing desired properties of a material.

BACKGROUND

The statements in this section merely provide background information related to the present disclosure and may not constitute prior art.

Engineers and product developers may employ a trial-and-error method to identify, test, and develop desired properties of a material, such as a composite material (e.g., polyurethane foam). As an example, an operator may fabricate a test composite material having given properties from among a large number of tunable properties, obtain a scanning electron microscope (SEM) image of the composite material, and determine whether the test composite material is feasible for a particular environment or implementation. Accordingly, the conventional trial-and-error method of identifying and analyzing desired properties of a material is a time-consuming and resource-intensive process. These issues with conventional methods for identifying and analyzing desired properties of a material, among other issues, are addressed by the present disclosure.

SUMMARY

This section provides a general summary of the disclosure and is not a comprehensive disclosure of its full scope or all of its features.

The present disclosure provides a method including generating a plurality of synthetic images of a material, where each synthetic image from among the plurality of synthetic images is associated with a feasibility value greater than a threshold synthetic feasibility value. The method includes determining, for each synthetic image from among the plurality of synthetic images, one or more material properties of the material and one or more process parameters of the material based on the synthetic image and generating a plurality of data points and a Pareto surface based on the one or more material properties and the one or more process parameters. The method includes selecting a target data point based on the plurality of data points and a distance between a set of data points from among the plurality of data points and the Pareto surface.

In some forms, the plurality of synthetic images of the material are generated using a generative adversarial network. In some forms, the method further includes providing feedback information to the generative adversarial network based on the target data point. In some forms, the method further includes generating the plurality of synthetic images based on the feedback information. In some forms, the generative adversarial network comprises a generator configured to generate a plurality of synthetic test images based on feedback information, a feasibility discriminator, and an actual image discriminator. The feasibility discriminator is configured to obtain an infeasible set of actual images from among a plurality of actual images of the material, where the infeasible set of actual images are associated with a feasibility value that is less than the threshold synthetic feasibility value. The feasibility discriminator is configured to output a set of feasible synthetic test images from among the plurality of synthetic test images based on a comparison between the plurality of synthetic test images and the infeasible set of actual images. The actual image discriminator is configured to obtain a feasible set of actual images from among the plurality of actual images, where the feasible set of actual images are associated with a feasibility value that is greater than the threshold synthetic feasibility value. The actual image discriminator is configured to output the plurality of synthetic images from among the set of feasible synthetic test images based on a comparison between the set of feasible synthetic test images and the feasible set of actual images.

In some forms, the one or more material properties and the one or more process parameters are determined using an image-based neural network. In some forms, the pareto surface is generated based on one of a pareto efficient global optimization routine and a non-dominated sorting genetic routine. In some forms, the method further includes clustering the plurality of data points to identify one or more clusters associated with the plurality of data points, identifying, as the set of data points, one or more cluster centroids from among the one or more clusters, and selecting, as the target data point, a cluster centroid from among the one or more cluster centroids based on a distance between the one or more cluster centroids and the pareto surface. In some forms, plurality of data points are clustered based on a self-organizing map routine. In some forms, plurality of synthetic images of the material are generated using a generative adversarial network, and the method further comprises fabricating a test material based on the target data point, determining a feasibility value of the test material, and selectively updating one or more weights of the generative adversarial network based on the feasibility value of the test material. In some forms, the method further includes selectively labeling one of a target actual image associated with the test material and a target synthetic image associated with the target data point based on the feasibility value of the test material, and storing one of the target actual image and the target synthetic image in a training database based on the feasibility value of the test material.

In some forms, the material properties comprise a mechanical characteristic of the material, an electrical characteristic of the material, a thermal characteristic of the material, a chemical characteristic of the material, or a combination thereof. In some forms, the one or more process parameters comprise a composition of the material, heat treatment parameters, or a combination thereof.

The present disclosure provides a generative adversarial network and an image-based neural network. The system includes one or more processors and one or more nontransitory computer-readable mediums storing instructions that are executable by the one or more processors. The instructions include generating a plurality of synthetic images of a material, where each synthetic image from among the plurality of synthetic images is associated with a feasibility value greater than a threshold synthetic feasibility value. The instructions include determining, for each synthetic image from among the plurality of synthetic images, one or more material properties of the material and one or more process parameters of the material based on the synthetic image, where the one or more material properties comprise a mechanical characteristic of the material, an electrical characteristic of the material, a thermal characteristic of the material, a chemical characteristic of the material, or a combination thereof, and where the one or more process parameters comprise a composition of the material, heat treatment parameters, or a combination thereof. The instructions include generating a plurality of data points and a pareto surface based on the one or more material properties and the one or more process parameters and selecting a target data point based on the plurality of data points and a distance between a set of data points from among the plurality of data points and the pareto surface.

In some forms, the plurality of synthetic images of the material are generated using the generative adversarial network, and the instructions further comprise providing feedback information to the generative adversarial network based on the target data point and generating the plurality of synthetic images based on the feedback information. In some forms, the instructions further include clustering the plurality of data points to identify one or more clusters associated with the plurality of data points, identifying, as the set of data points, one or more cluster centroids from among the one or more clusters, and selecting, as the target data point, a cluster centroid from among the one or more cluster centroids based on a distance between the one or more cluster centroids and the pareto surface. In some forms, the instructions further include fabricating a test material based on the target data point, determining a feasibility value of the test material, and selectively updating one or more weights of the generative adversarial network based on the feasibility value of the test material. In some forms, the instructions further include selectively labeling one of a target actual image associated with the test material and a target synthetic image associated with the target data point based on the feasibility value of the test material, and storing one of the target actual image and the target synthetic image in a training database based on the feasibility value of the test material.

The present disclosure provides a method including generating a plurality of synthetic images of a material, where each synthetic image from among the plurality of synthetic images is associated with a feasibility value greater than a threshold synthetic feasibility value. The method includes determining, for each synthetic image from among the plurality of synthetic images, one or more material properties of the material and one or more process parameters of the material based on the synthetic image, where the one or more material properties comprise a mechanical characteristic of the material, an electrical characteristic of the material, a thermal characteristic of the material, a chemical characteristic of the material, or a combination thereof, and where the one or more process parameters comprise a composition of the material, heat treatment parameters, or a combination thereof. The method includes generating a plurality of data points and a pareto surface based on the one or more material properties and the one or more process parameters and selecting a target data point based on the plurality of data points and a distance between a set of data points from among the plurality of data points and the pareto surface.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
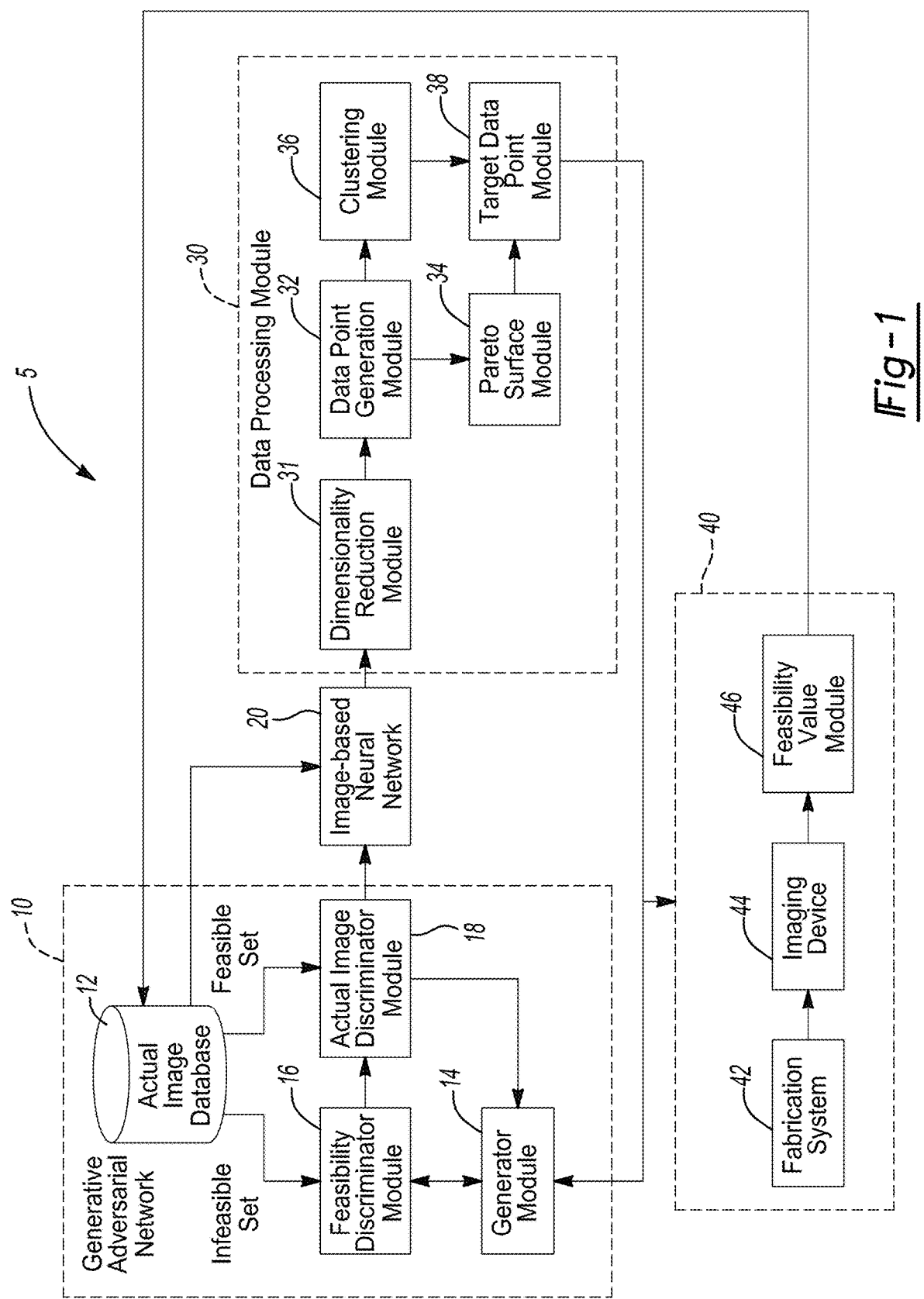
FIG. 1 is a functional block diagram of a material identification and analysis environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a machine learning-based system for identifying and analyzing desired material properties and process parameters of a material. The machine learning-based system includes a generative adversarial network that includes a generator and a plurality of discriminators that are collectively configured to generate synthetic images of the material based on one or more defined material properties, process parameters, and a feasibility value associated with the material properties/process parameters. An image-based neural network is configured to predict the material properties and/or process parameters of the synthetic image, and a data processing module is configured to generate data points and a pareto surface based on the identified material properties and/or process parameters. The data processing module then performs a clustering routine to identify one or more clusters and cluster centroids associated with the data points and selects one of the data points based on a distance between the cluster centroids and the pareto surface. The selected data point (i.e., the target data point) is identified as a pareto optimal solution and, thus, a point of interest in the pareto space.

As such, the machine learning-based system inhibits the time and resources needed for identifying and analyzing desired properties of a composite material compared to conventional trial-and-error-based identification and analysis techniques, which may include fabricating the composite material in accordance with selected process parameters/material properties, capturing actual images of the composite material, and evaluating the composite material to determine whether the material properties/process parameters satisfy one or more design constraints (e.g., determining whether the material properties/process parameters pareto optimal solutions).

Referring to FIG. 1, a material identification and analysis (MIA) environment 5 is provided and generally includes a generative adversarial network (GAN) 10, an image-based neural network (IBNN) 20, a data processing module 30, and a testing environment 40. It should be readily understood that any one of the components of the GAN 10, the IBNN 20, the data processing module 30, and the testing environment 40 can be provided at the same location or distributed at different locations (e.g., via one or more edge computing devices) and communicably coupled accordingly. In one form, the GAN 10, the IBNN 20, the data processing module 30, and the testing environment 40 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others). While the MIA environment 5 discloses the GAN 10, it should be understood that any type of generative models (e.g., a variational auto encoder) may be used in place of or in addition to the GAN 10.

Figure 2:
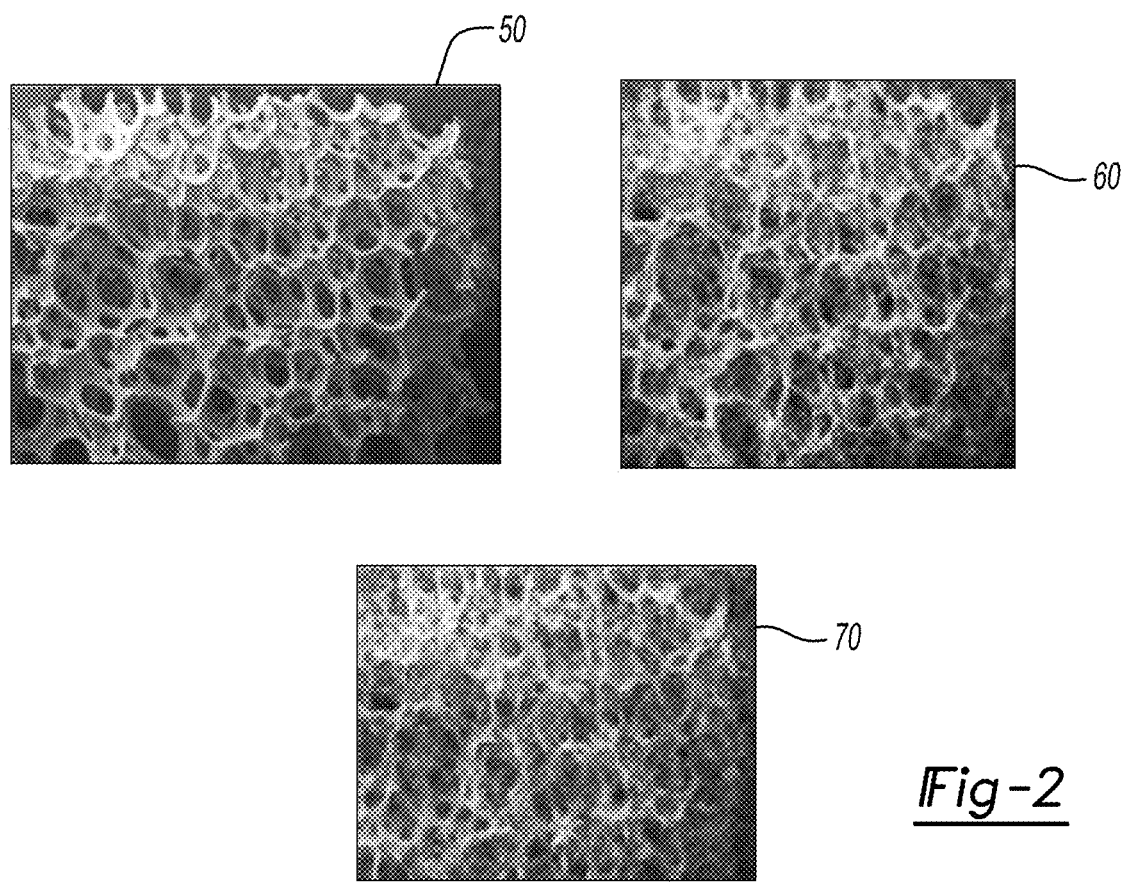
FIG. 2 is a schematic of actual and synthetic images of a composite material in accordance with the teachings of the present disclosure.

In one form, the GAN 10 is a deep learning model and includes an actual image database 12, a generator module 14, a feasibility discriminator module 16, and an actual image discriminator module 18. In one form, the actual image database 12 includes a plurality of actual images of a material (e.g., three-dimensional or four-dimensional image data of a composite material, such as a polyurethane foam). As used herein, "actual images" refer to images obtained from an imaging device, such as a two-dimensional camera, a three-dimensional camera, a red-green-blue (RGB) camera, a stereo vision camera, a SEM, among other imaging devices. As an example and as shown in FIG. 2, the actual image database 12 may include actual image 50, which is an SEM image of polyurethane foam.

In some forms, the actual images of the material are labeled with one or more material properties, one or more process parameters, and a feasibility value during a training process or when a fabrication process of a test material is completed, as described below in further detail. As used herein, "feasibility value" refers to a value that corresponds to the likelihood that the material with given material properties and process parameters can be physically fabricated in the testing environment 40 within given time and resource-based constraints. As an example, the feasibility value may be a numerical value between and including 0-1, where a feasibility value of "0" indicates that the material with given material properties and process parameters cannot be physically fabricated in the testing environment 40 within given time and resource-based constraints, and a feasibility value of "1" indicates that the material can be physically fabricated in the testing environment 40 within given time and resource-based constraints.

The one or more material properties include, but are not limited to: a mechanical characteristic of the material (e.g., tensile stress, tensile modulus, and/or tensile strength), an electrical characteristic of the material (e.g., resistance, capacitance, and/or inductance), a thermal characteristic of the material (e.g., thermal conductivity, thermal diffusivity, specific heat capacity, coefficient of thermal expansion, and/or thermal effusivity), a chemical characteristic of the material (e.g., combustibility, susceptibility to corrosion, acidity/basicity, toxicity, enthalpy of formation, and/or chemical stability in a given environment), or a combination thereof. The one or more process parameters include, but are not limited to: a composition of the material (an additive/reinforcement type or percentage and/or a matrix type/percentage), heat treatment parameters (e.g., solution heat treatment parameters, warm aging parameters, annealing parameters, and/or precursor materials), or a combination thereof.

In one form, the generator module 14 is configured to generate a plurality of synthetic test images of the material. In one form, the generator module 14 generates the synthetic test images based on an n×1 vector that is indicative of feedback information received from the data processing module 30, one or more selected material properties, and/or one or more selected process parameters, and/or a feasibility value associated with the selected material properties/process parameters (hereinafter referred to as "G(z)"), where n corresponds to the dimensions of G(z). In one form, each synthetic test image is associated with a feasibility value greater than a threshold synthetic feasibility value (i.e., the feasibility value of G(z) is greater than a threshold synthetic feasibility value). Additional details regarding the feedback information are provided below.

To perform the functionality described herein, the generator module 14 may include a neuron array having an input layer, one or more hidden layers, and an output layer. In one form, the various layers are connected via a plurality of connections having various synaptic weights. In one form, the connections may be fully connected or may not be fully connected, such as a convolutional neural network. In one form, the input layer may employ a reshape layer, the one or more hidden layers may employ a plurality of convolutional layers (e.g., a rectified linear unit layer, a batch normalization layer, a dense layer, among others), and the output layer may employ a TANH activation layer that outputs the synthetic test images. In one form, the generator module 14 may be trained using known training routines.

In one form, the feasibility discriminator module 16 obtains an infeasible set of actual images of the material stored in the actual image database 12 and the synthetic images generated by the generator module 14. In one form, the feasibility discriminator module 16 outputs a set of feasible synthetic test images from among the synthetic test images based on a comparison between the infeasible set of actual images and the synthetic test images. In one form, the infeasible set of actual images are associated with a feasibility value that is less than the threshold synthetic feasibility value. As such, the feasibility discriminator module 16 is configured to distinguish the infeasible set of actual images of the material stored in the actual image database 12 and the synthetic test images and therefore only provide a feasible set of synthetic test images to the actual image discriminator 18.

In one form, the actual image discriminator module 18 obtains a feasible set of actual images of the material stored in the actual image database 12 and the feasible set of synthetic test images output by the feasibility discriminator module 16. In one form, the actual image discriminator module 18 outputs the synthetic images from among the feasible set of synthetic test images to the IBNN 20 based on a comparison between the feasible set of synthetic test images and the feasible set of actual images. In one form, the feasible set of actual images are associated with a feasibility value that is greater than the threshold synthetic feasibility value. As such, the actual image discriminator module 18 is configured to distinguish the feasible set of actual images of the material stored in the actual image database 12 and the feasible synthetic test images and therefore provide synthetic images that accurately represent the selected material properties and/or process parameters to the IBNN 20. As an example and referring to FIGS. 1 and 2, the actual image discriminator module 18 outputs synthetic images 60, 70 having material properties/process parameters corresponding to labeled material properties/process parameters of the actual image 50.

To perform the functionality described herein, the feasibility discriminator module 16 and the actual image discriminator module 18 may each include a neuron array having an input layer, one or more hidden layers, and an output layer. In one form, the various layers are connected via a plurality of connections having various synaptic weights. In one form, the connections may be fully connected or may not be fully connected, such as a convolutional neural network. In one form, the input layer may employ a reshape layer, the one or more hidden layers may employ a plurality of convolutional layers (e.g., a rectified linear unit layer, a batch normalization layer, a dense layer, among others), and the output layer may employ a sigmoid activation layer that outputs a prediction indicating whether the image is a synthetic image/feasible test synthetic image or an actual image.

In one form, the IBNN 20 is configured to determine one or more material properties and one or more process parameters of the material based on the synthetic images. In one form, the IBNN 20 is a residual network-type convolutional neural network (e.g., a ResNet-18, ResNet-50, among other residual networks) that is configured to perform a deep learning image regression routine on the synthetic images to determine the one or more material properties/process parameters. In one form, the IBNN 20 is trained based on the labeled images stored in the actual image database 12 and using known convolutional neural network training routines. In one form, the IBNN 20 is trained such that a loss function of a mean squared error loss of the IBNN 20 is greater than a threshold value.

In one form, the data processing module 30 includes a dimensionality reduction module 31, a data point generation module 32, a pareto surface module 34, a clustering module 36, and a target data point module 38. In one form, the dimensionality reduction module 31 is configured to reduce the number of dimensions of the data received from the IBNN 20 (i.e., the identified material properties and/or process parameters) such that the number of dimensions is associated with the material properties and/or process parameters having the largest feature influence on the material. In one form, the dimensionality reduction module 31 is configured to perform a principal component analysis (PCA) routine or other known dimensionality reduction routines to reduce the number of dimensions to a predetermined number of dimensions. As an example, the dimensionality reduction module 31 reduces the received data having at least three dimensions to the two dimensions having the largest feature influence on the material. It should be understood that the dimensionality reduction module 31 may be removed from the data processing module 30 in some forms.

Figure 3:
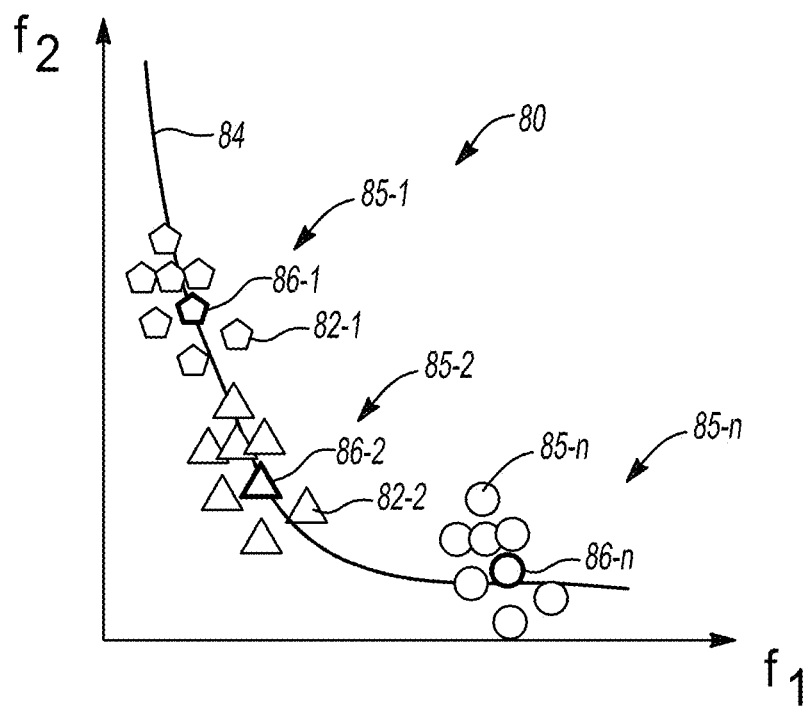
FIG. 3 is a graph illustrating a pareto surface, a plurality of data points, and clusters in accordance with the teachings of the present disclosure.

In one form and referring to FIGS. 1 and 3, the data point generation module 32 is configured to generate a graph 80 having axes that correspond to the material properties/process parameters having the largest feature influence (shown as $f_1$ and $f_2$ in FIG. 3). While the graph 80 is shown as a two-dimensional region, it should be understood that the graph 80 may have any number of dimensions in other forms. In one form, the data point generation module 32 is configured to generate data points 82-1, 82-2, . . . 82-n (collectively referred to hereinafter as "data points 82") based on the one or more material properties and the one or more process parameters.

The pareto surface module 34 is configured to generate a pareto surface 84 based on the data points 82 and one of a pareto efficient global optimization (ParEGO) routine and a non-dominated sorting genetic routine II/III (NSGA-II/III). While the pareto surface 84 is illustrated as a two-dimensional line in FIG. 3, it should be understood that the pareto surface 84 may be represented as a three-dimensional line or surface (e.g., a 3D interpolated surface).

The clustering module 36 is configured to group/cluster the data points 82 into one or more clusters 85-1, 85-2, . . . 85-n (collectively referred to hereinafter as "clusters 85") and identify or generate one or more cluster centroids 86-1, 86-2, . . . 86-n (collectively referred to hereinafter as "cluster centroids 86") based on a clustering routine. In one form, the clustering module 36 identifies the cluster centroids 86 from among the data points 82. In one form, the clustering module 36 generates the cluster centroids 86 based on the data points 82. Example clustering routines include, but are not limited to, a connectivity-based clustering routine (e.g., hierarchal clustering), a self-organizing map (SOM) clustering routine (e.g., a Kohonen SOM, a growing SOM, among others), a centroid-based clustering routine (e.g., k-means clustering), a density-based clustering routine (e.g., a mean shift clustering, a density-based spatial clustering (DBSCAN), among others), and a distribution-based clustering routine (e.g., Gaussian mixture models clustering). In one form, the number of clusters is predefined or selected based on known cluster number determination routines (e.g., the number of clusters is determined based on an elbow plot of the clusters). In one form, the clustering module 36 is configured to perform a validation routine (e.g., applying cluster validation indices) to determine whether the clusters match the original data and selectively adjust the clusters based on the results of the validation routine.

The target data point module 38 is configured to select a target data point from among the cluster centroids 86 based on a distance between the cluster centroids 86 and the pareto surface 84. In one form, the target data point module 38 is configured to calculate a Euclidean distance between each of the cluster centroids 86 and the pareto surface 84 and select the cluster centroid 86 having the shortest Euclidean distance as the target data point. In one form, the target data point is associated with material properties and/or process parameters that provide a pareto optimal solution for the given material.

The target data point module 38 is configured to provide the feedback information that includes the target data point to the generator module 14. Accordingly, the generator module 14 may generate synthetic images having one or more material properties/process parameters that are closer to the pareto optimal solution, thereby inhibiting the amount of time and resources utilized in identifying and analyzing the desired material properties and/or process parameters of the material.

Additionally, the target data point module 38 is configured to provide the feedback information that includes the target data point to the testing environment 40, which includes a fabrication system 42, an imaging device 44, and a feasibility value module 46. In one form, the fabrication system 42 is configured to fabricate a test material based on the target data point. As such, the fabrication system 42 may include one or more manufacturing devices, tools, controllers, human-machine-interfaces (HMI), and/or other components for fabricating the material such that the one or more process parameters and the one or more material properties of the test material correspond to the target data point.

In one form, the imaging device 44 (e.g., the SEM) is configured to capture an image of the test material, and the feasibility value module 46 is configured to determine a feasibility value of the test material. In one form, the feasibility value module 46 measures the one or more process parameters and material properties of the test material (e.g., the mechanical characteristics, electrical characteristics, thermal characteristics, and/or chemical characteristics) and determines the feasibility value based on the one or more material properties/process parameters.

In one form, the feasibility value module 46 is configured to selectively update the GAN connection weights (i.e., the weights of the connections of the generator module 14, the feasibility discriminator module 16, and/or the actual image discriminator module 18) based on the feasibility value. As an example, the feasibility value module 46 updates the GAN connection weights when the feasibility value is less than a threshold feasibility value of the test material.

Additionally, the feasibility value module 46 is configured to label the synthetic image associated with the target data point and the test material (i.e., a target actual image) as infeasible when the feasibility value is less than the threshold value and at least one of storing the labeled image in the actual image database 12 and discarding the infeasible target actual image. In one form, the feasibility value module 46 is configured to label the target actual image as feasible and with the process parameters/material properties when the feasibility value is greater than the threshold value and store the labeled image in the actual image database 12.

Figure 4:
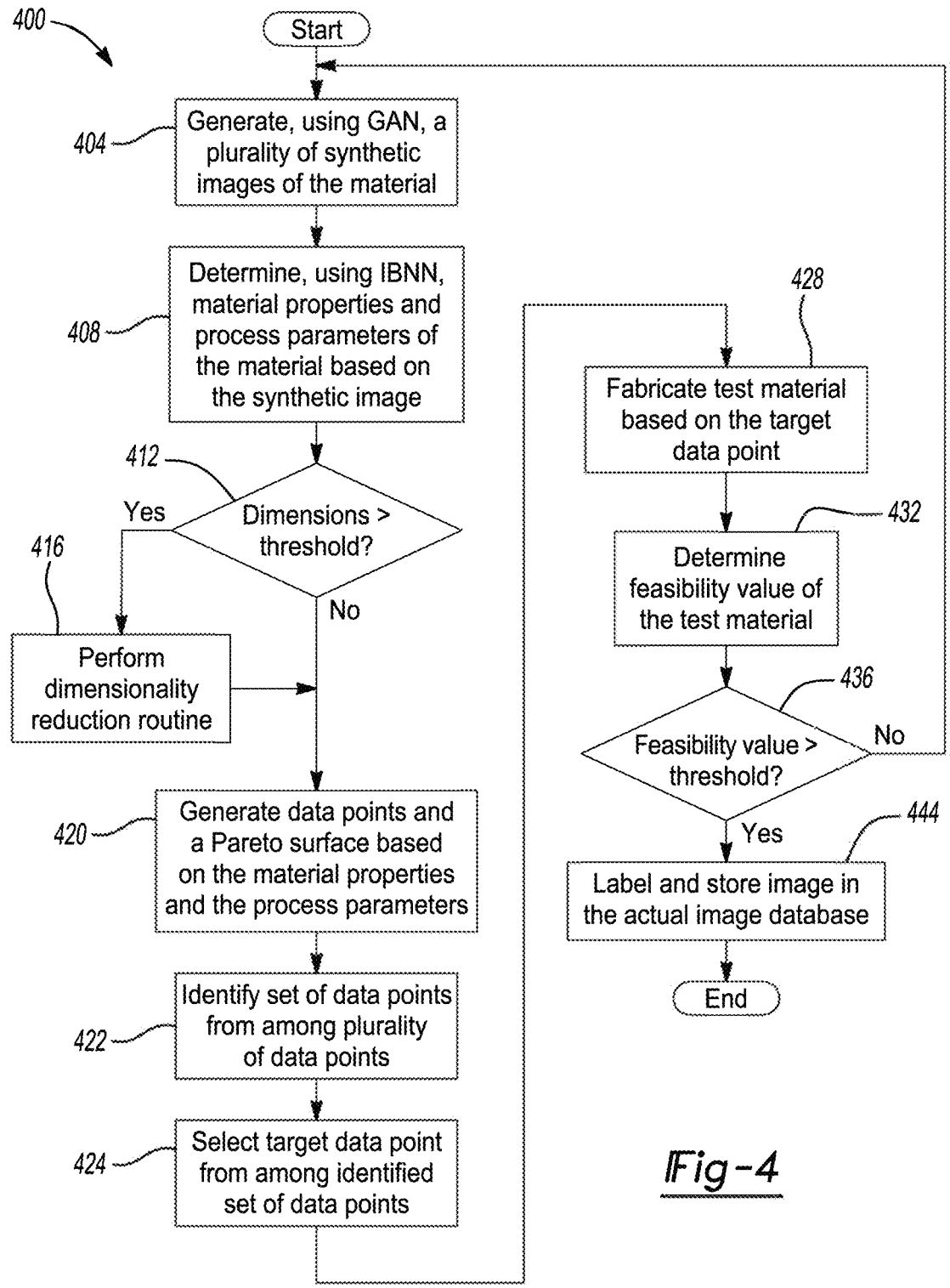
FIG. 4 is an example control routine for analyzing a material in accordance with the teachings of the present disclosure.

Referring to FIG. 4, a routine 400 for identifying and analyzing desired material properties/process parameters of a material is shown. At 404, the GAN 10 generates the plurality of synthetic images of the material. Additional details regarding step 404 are provided below with reference to FIG. 5. At 408, the IBNN 20 determines the material properties and/or process parameters of the material based on the synthetic image. At 412, the data processing module 30 determines whether the number of dimensions of the material properties and/or process parameters is greater than a threshold value. If the number of dimensions is greater than the threshold value, the routine 400 proceeds to 416, where the data processing module 30 performs the dimensionality reduction routine to reduce the dimensions of the material properties/process parameters to a predetermined number of dimensions. Otherwise, if the number of dimensions is less than or equal to the number of dimensions at 412, the routine 400 proceeds to 420.

At 420, the data processing module 30 generates the data points 82 and the pareto surface 84 based on the material properties and the process parameters based on one of the ParEGO and NSGA-II/III routines. At 422, the data processing module 30 identifies a set of data points from among the plurality of data points 82 and selects a target data point from among the set of data points at 424. Additional details regarding steps 422 and 424 are provided below with reference to FIG. 6. At 428, the fabrication system 42 fabricates the test material based on the target data point, and the feasibility value module 46 determines the feasibility value of the test material at 432. At 436, the feasibility value module 46 determines whether the feasibility value is greater than a threshold value. If the feasibility value is less than the threshold value, the routine 400 returns to 404, where the feasibility value module 46 can instruct the GAN 10 to update the weights of the generator module 14, the feasibility discriminator module 16, and/or the actual image discriminator module 18 based on the feasibility value. If the feasibility value is greater than the threshold value at 436, the routine 400 proceeds to 444, where the feasibility value module 46 labels and stores the target actual image in the actual image database 12.

Figure 5:
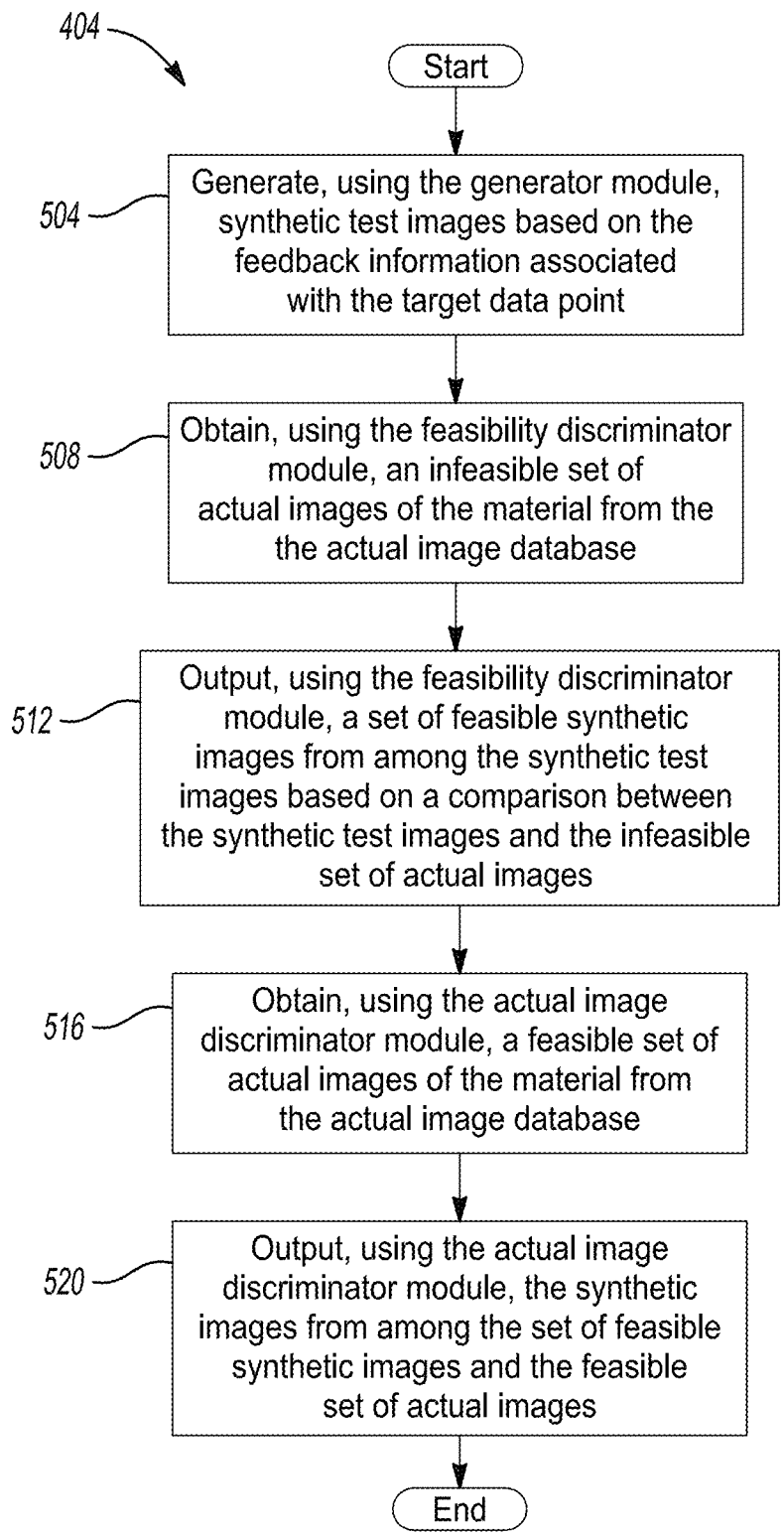
FIG. 5 is an example control routine for generating synthetic images of a material in accordance with the teachings of the present disclosure.

Referring to FIG. 5, a routine for generating the plurality of synthetic images of the material at step 404 of FIG. 4 is shown. At 504, the generator module 14 generates synthetic test images based on the feedback information associated with the target data point and/or the selected material properties/process parameters. At 508, the feasibility discriminator module 16 obtains an infeasible set of actual images of the material from the actual image database 12 and outputs a set of feasible synthetic images from among the synthetic test images based on a comparison between the synthetic test images and the infeasible set of actual images at 512. At 516, the actual image discriminator module 18 obtains a feasible set of actual images of the material from the actual image database 12 and outputs the synthetic images from among the set of feasible synthetic test images based on a comparison between the set of feasible set of synthetic images and feasible set of actual images at 520.

Figure 6:
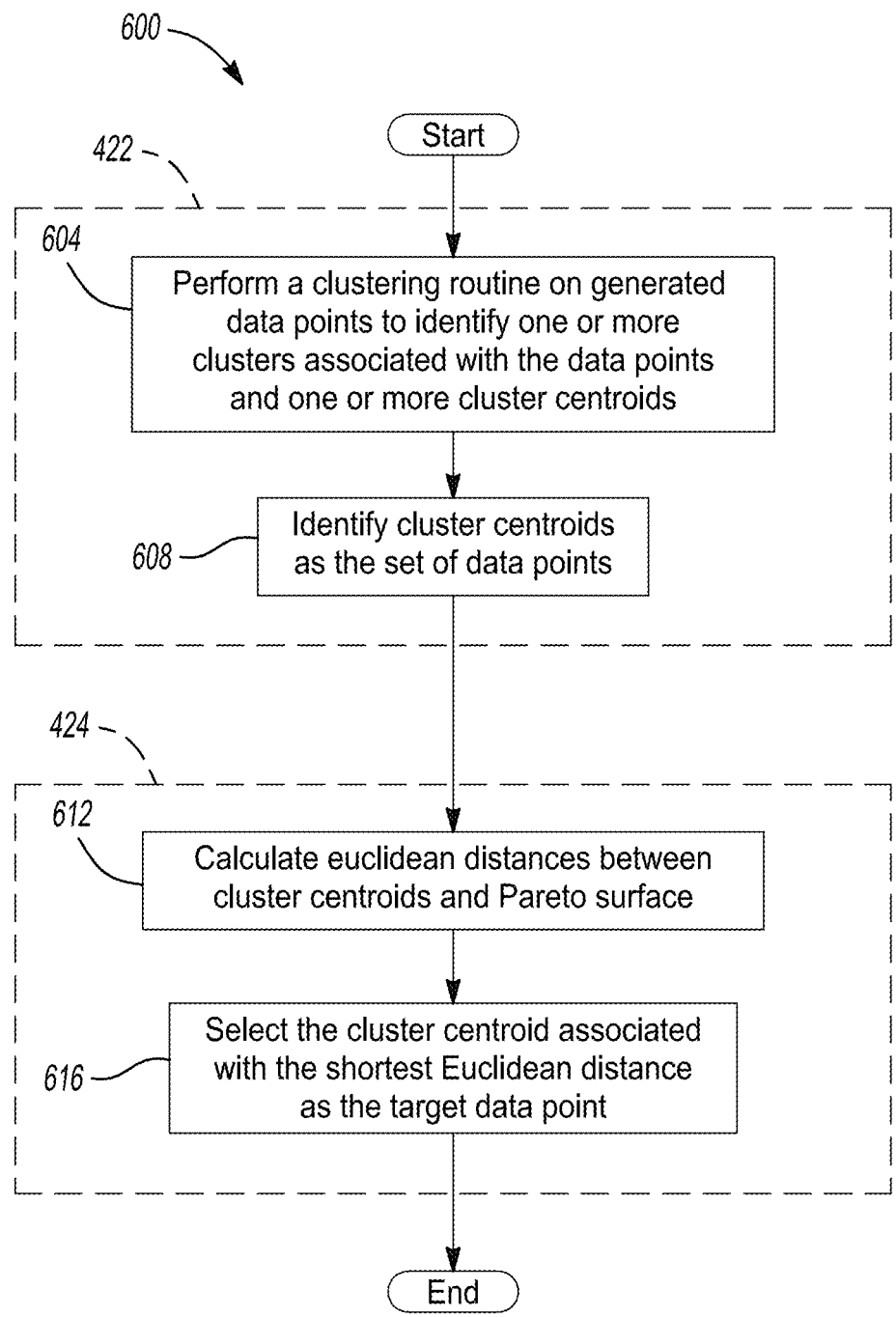
FIG. 6 is an example control routine for identifying desired characteristics of a material in accordance with the teachings of the present disclosure.

Referring to FIG. 6, a routine 600 for identifying a set of data points from among the plurality of data points 82 (i.e., step 422 of FIG. 4) and selecting a target data point from among the set of data points (i.e., step 426 of FIG. 4) is shown. At 604, the clustering module 36 performs a clustering routine (e.g., a global SOM routine) on the data points 82 to identify one or more clusters 85 associated with the data points and one or more cluster centroids 86. At 608, the clustering module 36 identifies the cluster centroids 86 as the set of data points. At 612, the target data point module 38 calculates the Euclidean distances between the cluster centroids 86 and the pareto surface 84 and selects the cluster centroid 86 associated with the shortest Euclidean distance as the target data point at 616. It should be understood that routines 400, 500, and 600 are just example routines performed by the GAN 10, the IBNN 20, the data processing module 30, the fabrication system 42, and/or the feasibility value module 46 and that other routines may be performed.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "network," "controller," and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
    generating a plurality of synthetic images of a material, wherein each feasible synthetic image from among the plurality of synthetic images is associated with a feasibility value greater than a threshold synthetic feasibility value, and wherein the feasibility value corresponds to a likelihood that the material can be physically fabricated;
    determining, for each feasible synthetic image from among the plurality of synthetic images, one or more material properties of the material and one or more process parameters of the material;
    generating a plurality of data points and a pareto surface based on the one or more material properties and the one or more process parameters;
    selecting a target data point based on the plurality of data points and a distance between a set of data points from among the plurality of data points and the pareto surface; and
    fabricating a test material based on the target data point in a testing environment.

2. The method of claim 1, wherein the plurality of synthetic images of the material are generated using a generative adversarial network.

3. The method of claim 2 further comprising providing feedback information to the generative adversarial network based on the target data point.

4. The method of claim 3 further comprising generating the plurality of synthetic images based on the feedback information.

5. The method of claim 2, wherein the generative adversarial network comprises:
    a generator configured to generate a plurality of synthetic test images based on feedback information;
    a feasibility discriminator configured to:
        obtain an infeasible set of actual images from among a plurality of actual images of the material, wherein the infeasible set of actual images are associated with a feasibility value that is less than the threshold synthetic feasibility value; and
        output a set of feasible synthetic test images from among the plurality of synthetic test images based on a comparison between the plurality of synthetic test images and the infeasible set of actual images; and
    an actual image discriminator configured to:
        obtain a feasible set of actual images from among the plurality of actual images, wherein the feasible set of actual images are associated with a feasibility value that is greater than the threshold synthetic feasibility value; and
        output the plurality of synthetic images from among the set of feasible synthetic test images based on a comparison between the set of feasible synthetic test images and the feasible set of actual images.

6. The method of claim 1, wherein the one or more material properties and the one or more process parameters are determined using an image-based neural network.

7. The method of claim 1, wherein the pareto surface is generated based on one of a pareto efficient global optimization routine and a non-dominated sorting genetic routine.

8. The method of claim 1 further comprising:
    clustering the plurality of data points to identify one or more clusters associated with the plurality of data points;
    identifying, as the set of data points, one or more cluster centroids from among the one or more clusters; and
    selecting, as the target data point, a cluster centroid from among the one or more cluster centroids based on a distance between the one or more cluster centroids and the pareto surface.

9. The method of claim 8, wherein the plurality of data points are clustered based on a self-organizing map routine.

10. The method of claim 1, wherein the plurality of synthetic images of the material are generated using a generative adversarial network, and wherein the method further comprises:
    fabricating a test material based on the target data point;
    determining a feasibility value of the test material; and
    selectively updating one or more weights of the generative adversarial network based on the feasibility value of the test material.

11. The method of claim 10 further comprising:
    selectively labeling one of a target actual image associated with the test material and a target synthetic image associated with the target data point based on the feasibility value of the test material; and
    storing one of the target actual image and the target synthetic image in a training database based on the feasibility value of the test material.

12. The method of claim 1, wherein the one or more material properties comprise a mechanical characteristic of the material, an electrical characteristic of the material, a thermal characteristic of the material, a chemical characteristic of the material, or a combination thereof.

13. The method of claim 1, wherein the one or more process parameters comprise a composition of the material, heat treatment parameters, or a combination thereof.

14. A system including a generative adversarial network and an image-based neural network, the system comprising:
    one or more processors and one or more non-transitory computer-readable mediums storing instructions that are executable by the one or more processors, wherein the instructions comprise:
        generating a plurality of synthetic images of a material, wherein each feasible synthetic image from among the plurality of synthetic images is associated with a feasibility value greater than a threshold synthetic feasibility value, and wherein the feasibility value corresponds to a likelihood that the material can be physically fabricated;
        determining, for each feasible synthetic image from among the plurality of synthetic images, one or more material properties of the material and one or more process parameters of the material, wherein the one or more material properties comprise a mechanical characteristic of the material, an electrical characteristic of the material, a thermal characteristic of the material, a chemical characteristic of the material, or a combination thereof, and wherein the one or more process parameters comprise a composition of the material, heat treatment parameters, or a combination thereof;

generating a plurality of data points and a pareto surface based on the one or more material properties and the one or more process parameters;

selecting a target data point based on the plurality of data points and a distance between a set of data points from among the plurality of data points and the pareto surface; and fabricating a test material based on the target data point in a testing environment.

15. The system of claim 14, wherein the plurality of synthetic images of the material are generated using the generative adversarial network, and wherein the instructions further comprise:

providing feedback information to the generative adversarial network based on the target data point; and generating the plurality of synthetic images based on the feedback information.

16. The system of claim 14, wherein the generative adversarial network comprises:

a generator configured to generate a plurality of synthetic test images based on feedback information;

a feasibility discriminator configured to:
  obtain an infeasible set of actual images from among a plurality of actual images of the material, wherein the infeasible set of actual images are associated with a feasibility value that is less than the threshold synthetic feasibility value; and
  output a set of feasible synthetic test images from among the plurality of synthetic test images based on a comparison between the plurality of synthetic test images and the infeasible set of actual images; and an actual image discriminator configured to:
  obtain a feasible set of actual images from among the plurality of actual images, wherein the feasible set of actual images are associated with a feasibility value that is greater than the threshold synthetic feasibility value; and
  output the plurality of synthetic images from among the set of feasible synthetic test images based on a comparison between the set of feasible synthetic test images and the feasible set of actual images.

17. The system of claim 14, wherein the instructions further comprise:

clustering, based on a self-organizing map routine, the plurality of data points to identify one or more clusters associated with the plurality of data points;

identifying, as the set of data points, one or more cluster centroids from among the one or more clusters; and selecting, as the target data point, a cluster centroid from among the one or more cluster centroids based on a distance between the one or more cluster centroids and the pareto surface.

18. The system of claim 14, wherein the instructions further comprise:

fabricating a test material based on the target data point;

determining a feasibility value of the test material; and selectively updating one or more weights of the generative adversarial network based on the feasibility value of the test material.

19. The system of claim 18, wherein the instructions further comprise:

selectively labeling one of a target actual image associated with the test material and a target synthetic image associated with the target data point based on the feasibility value of the test material; and storing one of the target actual image and the target synthetic image in a training database based on the feasibility value of the test material.

20. A method comprising:

generating, using a generative adversarial network, a plurality of synthetic images of a material, wherein each feasible synthetic image from among the plurality of synthetic images is associated with a feasibility value greater than a threshold synthetic feasibility value, wherein the feasibility value corresponds to a likelihood that the material can be physically fabricated;

determining, using an image-based neural network and for each feasible synthetic image from among the plurality of synthetic images, one or more material properties of the material and one or more process parameters of the material, wherein the one or more material properties comprise a mechanical characteristic of the material, an electrical characteristic of the material, a thermal characteristic of the material, a chemical characteristic of the material, or a combination thereof, and wherein the one or more process parameters comprise a composition of the material, heat treatment parameters, or a combination thereof;

generating a plurality of data points and a pareto surface based on the one or more material properties and the one or more process parameters;

selecting a target data point based on the plurality of data points and a distance between a set of data points from among the plurality of data points and the pareto surface; and fabricating a test material based on the target data point in a testing environment.

* * * * *